United States Patent [19]

DeVore

[11] 4,421,260
[45] Dec. 20, 1983

[54] PORTABLE CLOTHES CLOSET

[76] Inventor: Robert E. DeVore, Rte. 1, Box 451, Picayune, Miss. 39466

[21] Appl. No.: 269,738

[22] Filed: Jun. 2, 1981

[51] Int. Cl.³ .............................................. B60R 9/06
[52] U.S. Cl. ........................... 224/42.43; 224/42.03 A
[58] Field of Search ..................... 224/42.43, 42.45 A, 224/42.46 A, 313, 42.03 A, 42.07, 42.44; 280/769; 206/228.1, 289, 298, 279; 211/182, 198

[56] References Cited

U.S. PATENT DOCUMENTS

| | | | |
|---|---|---|---|
| 1,482,770 | 2/1924 | Terrell | 224/42.43 |
| 1,505,854 | 8/1924 | Branscum | 224/42.43 X |
| 1,543,046 | 6/1925 | Batts | 206/279 |
| 1,577,793 | 3/1926 | Durham et al. | 224/42.43 |
| 1,941,375 | 12/1933 | Wildman | 224/42.43 |
| 2,616,599 | 11/1952 | Hryhorczuk | 224/42.07 |
| 2,893,545 | 7/1959 | Garfunkel | 206/7 |
| 3,251,520 | 5/1966 | Van Dyke et al. | 224/42.44 X |
| 3,483,999 | 12/1969 | Barrett | 211/178 |
| 3,999,693 | 12/1976 | Cooper | |
| 4,009,744 | 3/1977 | Joslyn | |
| 4,293,069 | 10/1981 | Partain | 206/279 |

*Primary Examiner*—William Price
*Assistant Examiner*—David Voorhees
*Attorney, Agent, or Firm*—Berman, Aisenberg & Platt

[57] ABSTRACT

The invention disclosed herein is a portable clothes closet to be attached to a vehicle. The clothes closet has an attachment means to be secured to the frame of a vehicle. A base means is provided which can be releasably attached to the attachment means on the vehicle and provides a surface to support the storage device. A frame with a cross bar is provided from which to hang clothes and the frame is releasably attached to the base means. An enclosure is provided for the frame and is releasably attached to the base means to provide a protective sheath for the mobile clothes closet.

4 Claims, 7 Drawing Figures

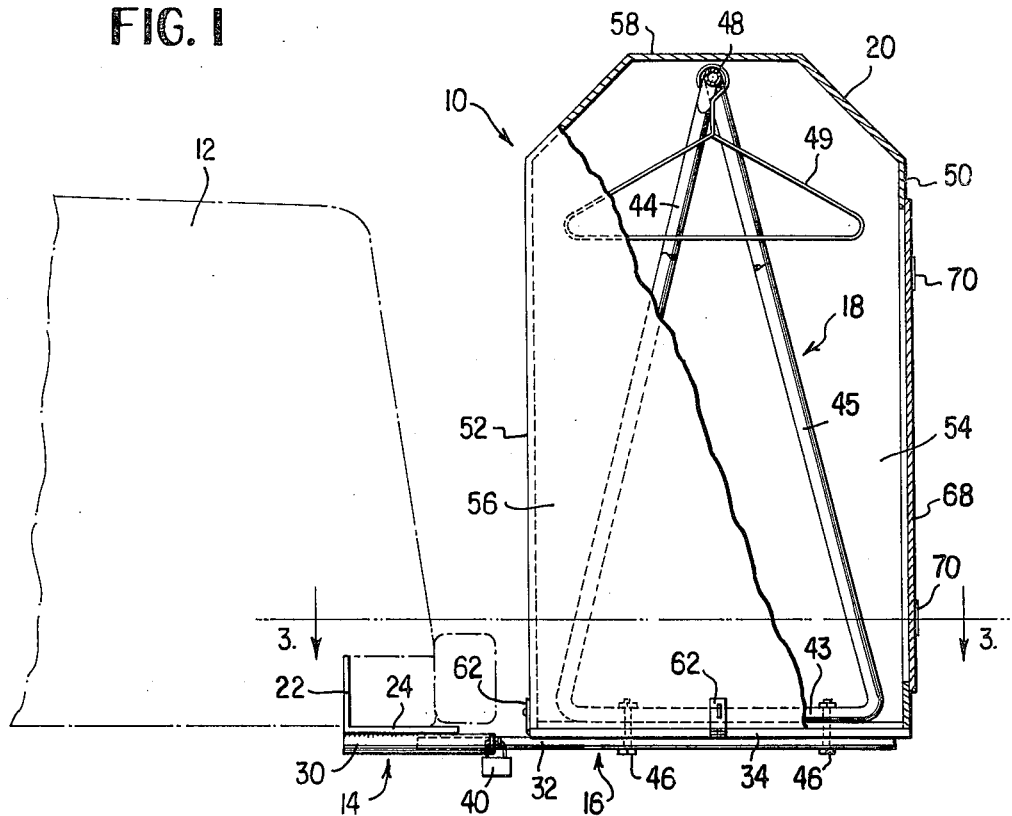
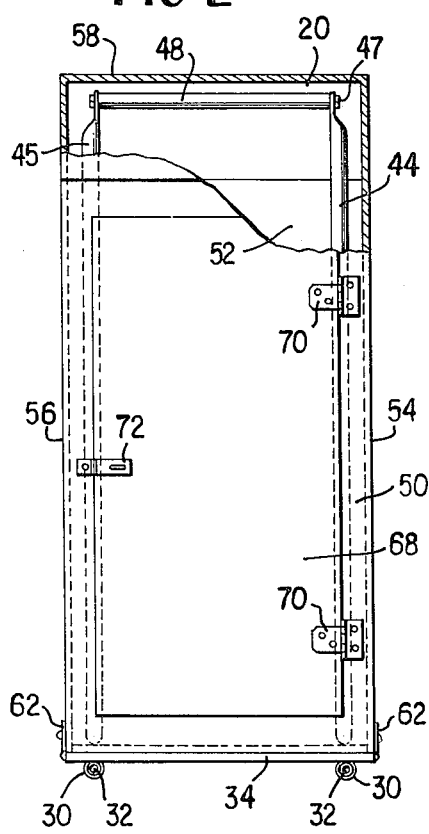
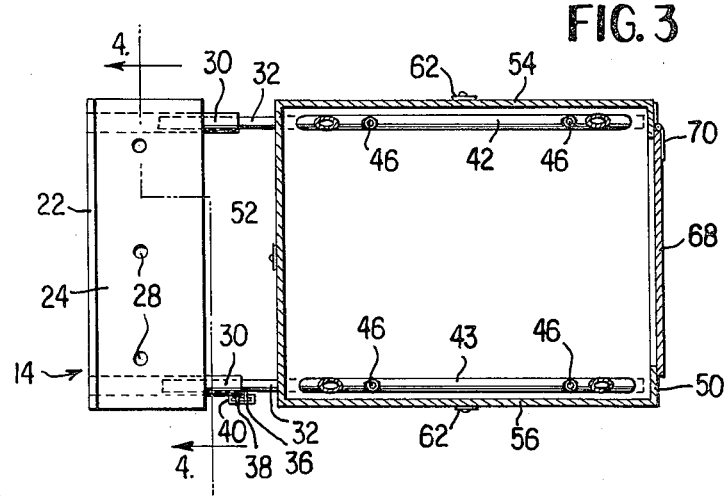
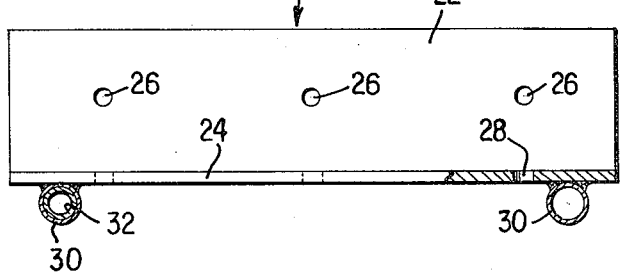

PORTABLE CLOTHES CLOSET

FIELD OF THE INVENTION

This invention relates to a portable clothes closet and particularly to a portable clothes closet that can be carried at the back of an automobile and detached for storage in a remote location.

BACKGROUND OF THE INVENTION

The background art shows a variety of designs for portable clothes closet apparatuses and bumper mounted attachments to vehicles to provide additional storage.

In U.S. Pat. No. 4,009,744 issued to John A. Joslyn on Mar. 1, 1977, is disclosed a mobile rack for carrying bicycles. The rack comprises a bumper mounted attachment from which are extended two vertical standards having rods extending horizontally with portions extending perpendicularly outward from the vertical standards. The horizontal portions have indentations to accept bicycles. The apparatus provides a bag to cover the bicycles mounted on the rack to prevent road dirt from being deposited on the bicycles.

In U.S. Pat. No. 3,999,693, issued to Terry Cooper, Sr. on Dec. 28, 1976, is shown a bumper attachment to be applied to small cars to extend the storage space of the car. A five-sided enclosure is mounted on the back bumper of an automobile and has a hinged top to open the compartment to accept luggage. The structure is provided to support the enclosure which is attached to and cantilevered from the frame of the vehicle. Mounted in the back wall of the storage compartment is a license plate holder, safety lights and a bumper. This device can be used to add storage capacity to small cars.

In U.S. Pat. No. 2,616,599, issued to N. A. Hrychorczuk on Nov. 4, 1952, is disclosed a bumper mounted storage device to expand the storage capacity of a vehicle. This device discloses a wooden storage box to be attached to the back bumper of a vehicle and provides a generally cubic-shaped storage compartment to be hung by attachment means from the rear bumper of the vehicle.

In U.S. Pat. No. 3,483,999, issued to S. P. Barrett on Dec. 16, 1969, is shown a portable, foldable and collapsible storage frame to support clothes draped on clothes hangers which are to be hung from a cross bar of the frame. The frame has a horizontal cross bar and two telescoping legs hingedly mounted on each end of the cross bar. The frame may be folded in transit and unfolded in a remote location, the legs extended telescopically to support the cross bar and provide a bar for storage of clothing.

In U.S. Pat. No. 2,893,545, issued to J. Garfunkel on July 7, 1959, is shown a structure for a collapsible wardrobe. The wardrobe comprises a flat, planar shipping crate which may be folded into the wardrobe. The flat crate may be folded into a rectangular shipping crate and a cross bar is provided to be attached to the upper edge of the cardboard crate. The cross bar is shown in cross section to have grooves running down the longitudinal centerline of the cross bar to accept the ends of the hanging hooks and lockingly engage the hanging hooks to prevent them from becoming disengaged during inadvertent movement of the wardrobe during shipping.

OBJECTS AND SUMMARIES OF THE INVENTION

It is an object of the current invention to provide a structure to store clothes on hangers and to be attached to the outside of a vehicle or to sit on a truck bed.

It is another object of the invention to provide a vehicle with additional storage capacity by providing a structure that can be added to the outside of a vehicle for the substantially wrinkle-free storage and transportion of hanging clothes.

It is another object of the current invention to provide a storage facility for storing hanging clothes that is transportable to a remote location and allows the storage frame incorporated in the structure to be moved into a remote housing location for use in remote storage.

It is a further object of the invention to provide a detachable clothes closet in which one can store hanging clothes and which is releasably attached to the outside of a vehicle and may be moved to a remote location.

It is a further object of the current invention to provide a clothes closet that may be remotely detached from a vehicle and stored remote from the vehicle, leaving no part extending from the outside perimeter of the vehicle.

It is a further object of the invention to provide a detachable storage structure for a vehicle with the facility to store hanging clothes that may be transported to a remote location with the vehicle, transporting the clothes substantially wrinkle-free inside the storage structure.

These and other objects of the current invention are achieved through the use of a portable clothes closet structure having an attachment means to attach the device to a vehicle. A platform is removably connected to the attachment means to support the storage device. A support or frame is provided to hang objects and may be releasably attached to the platform. An enclosure means is releasably attached to the platform over the support and provides a shield to prevent soiling of the objects hung on the frame by dirt, water, flying objects, etc. encountered in transit.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the specific embodiments, when read in connection with the accompanying drawings, wherein like reference characters indicate like parts throughout the several figures, and in which:

FIG. 1 presents a partially cutaway side view of the subject invention attached to the rear portion of a vehicle;

FIG. 2 presents a partially cutaway front elevational view of the subject invention;

FIG. 3 presents a sectional view and partial plan of the invention taken through lines 3—3 of FIG. 1;

FIG. 4 presents an elevational view of FIG. 3 taken through section lines 4—4;

BRIEF DESCRIPTION OF THE INVENTION

Figures 5, 6, 7:
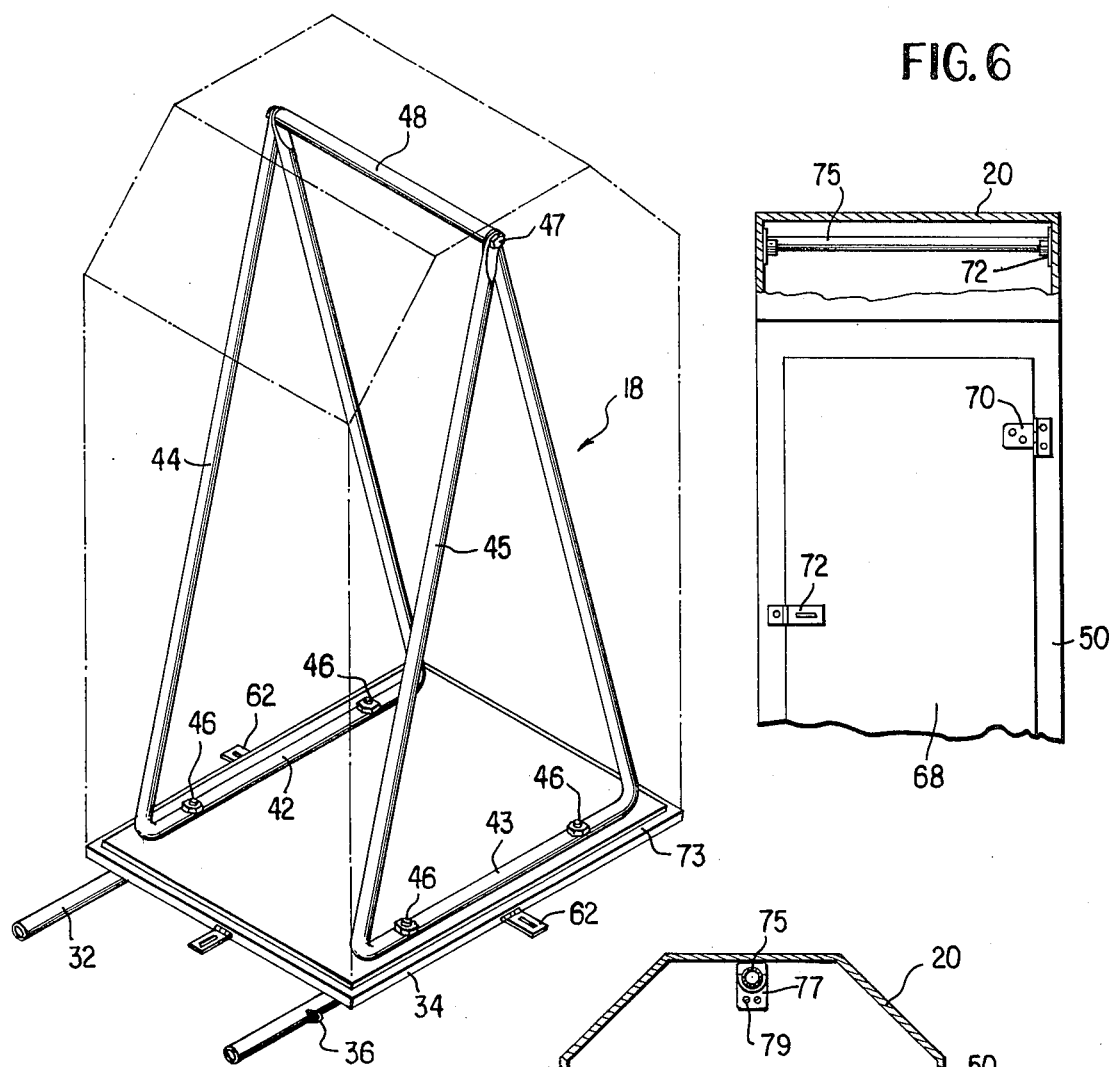
FIG. 5 is a perspective view of the clothes holding portion of the invention of FIG. 1 removed from the vehicle attachment means, with the enclosure shown in phantom line.
FIG. 6 is a partial front elevational view of a modification of the invention, with parts broken away to show another type of frame or support.
FIG. 7 is a cross-sectional elevational view of the invention shown in FIG. 6.

Referring now more particularly to FIG. 1, the portable clothes closet 10 is shown attached to the rear of a vehicle 12 by vehicle attachment means 14. Base means 16 is releasably attached to the vehicle attachment means 14 and supports frame member 18 and enclosure 20.

Vehicle attachment means 14 comprises an L-shaped bracket having a vertical member 22 fixedly attached to a horizontal member 24 by conventional means, such as welding. Vertical member 22 has a plurality of apertures 26 as seen in FIG. 4 and the horizontal member 24 has a plurality of apertures 28 as seen in FIG. 3. Apertures 24 and 28 accommodate bolts to attach the vehicle attachment means 14 to the frame of a vehicle.

Vehicle attachment means 14 has a plurality of, preferably two, female pipes 30 attached to horizontal member 24 parallel to the longitudinal centerline of vehicle 12. Pipes 30 are attached to horizontal member 24 by conventional means, such as welding.

Base member 16 has a flat floor plate member 34 and frame member 18 and enclosure 20 are attached to the top surface thereof. Fixedly attached to plate member or floor 34 are male tubes 32 which are internally accepted in the openings in female pipes 30 of the vehicle attachment means 14 to secure base means 16 to vehicle attachment means 14. The male tubes 32 have a male lock plate 36 protruding perpendicularly from the tubes 32 which limits the insertion of the male tube 32 into the female pipe 30. Adjacent the end of female pipe 30 is a projecting female lock plate 38. When the male tube 32 is inserted in the female pipe 30, male lock plate 36 is immediately adjacent female lock plate 38. The apertures in the lock plates 36 and 38 may be lined up and a lock 40 may be inserted through the apertures to secure male tube 32 inside female pipe 30 and prevent their disengagement.

Frame or support member 18 is releasably attached to the top surface of floor 34 and comprises a pair of vertical upstanding members 44,45 with integral horizontal members 42,43. The members 44,45 are preferably made from tubular stock which is bent into a generally triangular shape. Members 42,43 are attached to the floor 34 and the male tubes 32 by removable conventional fasteners, such as bolts 46. If desired, the floor 34 may be made of moldable material which would permit the members 42,43 to be molded into the surface of floor 34 and both held in place by bolts 46. The rigidity of the mounting of frame 18 is important due to vibrations occurring during movement of the portable closet 10. Connecting the tops of the members 44,45 is a horizontal cross-bar 48 upon which clothes hangers 49 may be hung, as shown in FIG. 1. The cross-bar 48 is attached to the mating portions of members 44 and 45 by conventionally known attachment means, such as a bolt 47.

Enclosure 20 is made of any suitable rigid material and had a front wall 50, back wall 52, side walls 54,56 and top 58 which are all sealingly joined at their peripheral edges. The enclosure, thus sealed, provides an overall waterproof enclosure to protect the contents of the portable closet 10. The enclosure 20 is releasably connected to floor 34 by hasps 62 mounted thereon to permit the enclosure 20 be lifted entirely off of floor 34 when access is desired to frame 18. After frame 18 is loaded with clothes hanging from cross-bar 48, the enclosure 20 may be fitted over the contents and locked into place by the hasps 62.

Front wall 50 has a door opening 56 which provides access to the interior of the enclosure to allow an individual to load and unload the closet as desired. A door 68 is hingedly connected to the front wall 50 by hinges 70 which allow the door 68 to be swung open and closed to allow access to the interior of enclosure 20. The door 68 can be locked in place by hasp 72 which receives a lock, not shown, to hold the door closed.

The floor 34 may be formed from a pair of flat pieces or may be integral in nature. A lip 73 extends around the periphery of floor 34 to provide a seat for the lower end of the enclosure 20.

A modified form of the invention is shown in FIGS. 6 and 7. This form corresponds to the form disclosed in FIGS. 1-5 except that the frame 18 is replaced by a bar 75 which extends between the side walls 54,56 of enclosure 20. The ends of bar 75 are supported by brackets 77 which are mounted on the interior faces of walls 54,56 by any conventional means, such as by screws 79.

In use, the portable storage closet or device is mounted on the rear of a vehicle by first attaching the L-shaped bracket of means 14 to a frame member or the like. Then, the clothes holding portion, which is bolted to tubes 32, is lifted to align the tubes 32 with the pipes 30, and the tubes 32 are inserted into pipes 30 until plates 36 and 38 abut each other. The joined parts are locked in place by a padlock 40. The vehicle and mounted storage device are thus prepared for a road trip. At the termination thereof, the clothes holding portion is removed from the L-shaped bracket and carried to any selected location, such as a motel room for use therein or to a garage for storage. The user has the option of removing enclosure 20 to permit access to the contents or may use the door 68 for this purpose. After the clothes holding portion is removed, only the L-shaped bracket is left on the vehicle and from the manner of mounting, no part of the bracket protrudes beyond the perimeter of the vehicle, as shown in FIG. 1.

On some vehicles, it may be necessary to mount the invention in a manner which blocks the rear tailights of the vehicle. Hence, it is anticipated that this invention may be provided with its own tailight, not shown, which is inter-connected to the tailight circuit of the vehicle.

The figures and specific description set forth in this application are for the purpose of illustrating the present invention and are not to be construed as limiting the present invention to the precise and detailed specific structure shown and described. Instead, the invention is intended to include substantially equivalent constructions embodying the basic teachings and inventive concept of the present invention.

What is claimed is:

1. A portable apparatus for storing and transporting clothes comprising:
   a waterproof enclosure comprising a bottom, a top, two upstanding walls, a rear, and a front, said front having an opening and a door for sealingly covering said opening,
   a bar extending between upper parts of said upstanding walls adapted to receive clothes hangers, and
   means on said enclosure for cooperating with means on a vehicle for removably attaching said enclosure to the exterior of a vehicle so that said enclosure may be easily detached from said vehicle and for orienting said enclosure in a position wherein said bar is horizontal and above said bottom and wherein said hangers hang downwardly from said bar.

2. The apparatus of claim 1 wherein said means for removably attaching includes means for locking said enclosure to said vehicle.

3. The apparatus of claim 2 wherein said door is pivotally attached to said enclosure, for rotation about an axis, by a hinge, and wherein the direction of said axis is perpendicular to the direction of said bar.

4. The apparatus of claim 3 wherein said means for removably attaching said enclosure to the exterior of a vehicle comprises first elongate cylindrical members on said vehicle which cooperate with second elongate cylindrical members on said enclosure.

* * * * *